Figure 1:
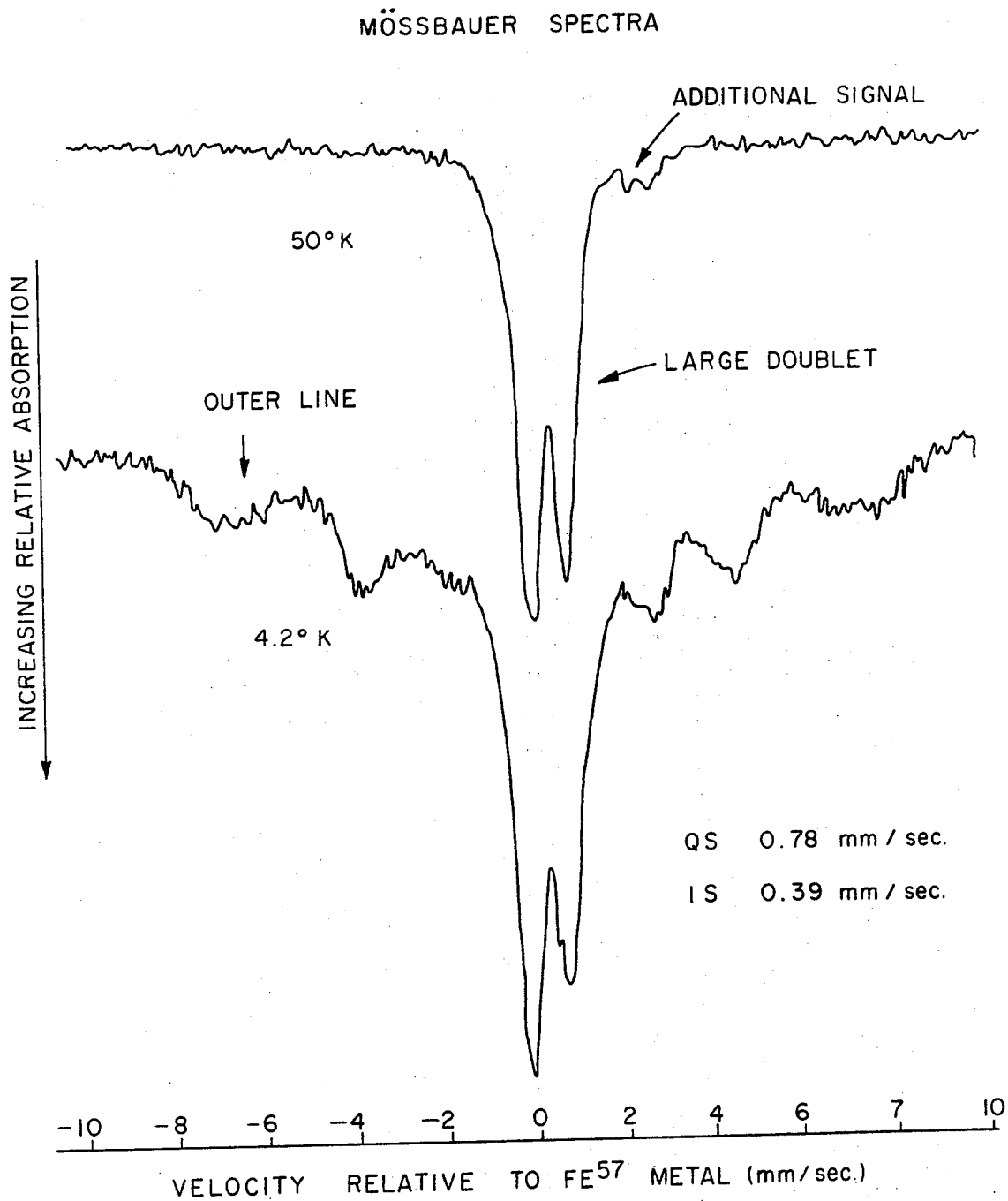

United States Patent
Burns

[15] 3,668,074
[45] June 6, 1972

[54] PROCESS FOR ISOLATION BY CRYSTALLIZATION OF THE Mo-Fe PROTEIN OF THE ENZYME NITROGENASE

[72] Inventor: Richard Charles Burns, Wilmington, Del.
[73] Assignee: E. I. du Pont de Nemours and Company, Wilmington, Del.
[22] Filed: Dec. 17, 1969
[21] Appl. No.: 885,909

[52] U.S. Cl. .................................195/62, 195/50, 195/66 R
[51] Int. Cl. ..........................................................C07g 7/02
[58] Field of Search .......................................195/50, 62, 66

[56] References Cited

UNITED STATES PATENTS 3,560,344  2/1971  Bulen.........................................195/50

Primary Examiner—Lionel M. Shapiro
Attorney—Anthony P. Mentis

[57] ABSTRACT

Disclosed is a process for obtaining crystals of the Mo-Fe protein fraction of the enzyme nitrogenase. This fraction is essential in the fixation of atmospheric nitrogen by certain microorganisms.

6 Claims, 2 Drawing Figures

PROCESS FOR ISOLATION BY CRYSTALLIZATION OF THE MO-FE PROTEIN OF THE ENZYME NITROGENASE

BACKGROUND OF THE INVENTION

1. Field of the Invention

This invention relates to the production of a needle-like, crystalline, proteinaceous product which contains both molybdenum and iron, obtained from the enzyme nitrogenase.

2. Description of Prior Art

Biological nitrogen fixation is an important natural process. It involves the reduction of nitrogen to ammonia by living organisms, particularly microorganisms or symbionts of the latter with certain plants. The multiprotein complex enzyme system responsible for the reduction of nitrogen is called nitrogenase. In addition to catalyzing biological nitrogen fixation, it has been shown to reduce a variety of other compounds, including azide, nitrous oxide, cyanides, isocyanides, and acetylenes. An understanding of the mechanism of the enzymatic catalysis is basic to the design and synthesis of catalysts capable of emulating nitrogenase for synthesis of some reduced nitrogen compounds and mediating reactions of carbon compounds. Preparation and analysis of pure enzyme and/or its components is the first step for such a goal because only with pure material can completely unambiguous analyses be made. Such unambiguous analyses of the physical and chemical properties of the enzyme and/or its components are essential for an understanding of the mechanism of enzymatic catalysis.

It has only been in recent years that advances have been made in the field by the discovery of cell-free systems capable of fixing nitrogen. The naturally occurring fractions are usually impure, preventing characterization and reproducibility. Nitrogenase from *Clostridum pasteurianum* and *Azotobacter vinelandii* has been split into two enzyme fractions, both of which must be present for nitrogenase catalytic activity. Both fractions are proteinaceous materials and contain non-heme iron and sulfur. One of them contains both molybdenum and iron and has been said to have a molecular weight of about 100,000–120,000 while the other fraction has iron but substantially no molybdenum and has about half the molecular weight. A summary of knowledge concerning nitrogen fixation and the biological systems is Hardy and Burns, Annual Review of Biochemistry 37, 331–351 (1968).

DESCRIPTION OF THE INVENTION

It has now been found that the molybdenum-iron protein fraction of nitrogenase can be obtained in pure, crystalline form. Needle-like crystals of this protein fraction can be obtained from its aqueous salt solutions by reducing the concentration of the salt to a point where the molybdenum-iron protein fraction is no longer soluble. As far as I am aware, this has never been done previously.

The salts which are useful in this process comprise water soluble salts of low molecular weight, which on dissolving, dissociate into anions and cations. Generally the valency of the individual anion or cation does not exceed 2. Exemplary of these salts are sodium chloride, sodium phosphate, sodium sulfate, sodium nitrate, sodium formate, sodium acetate, potassium chloride, tris-(hydroxymethyl)aminomethane ("-Tris") hydrochloride, magnesium chloride, ammonium chloride, ammonium formate and ammonium acetate. Crystallization generally occurs at a pH range of 6.0 to 8.0.

A solution rich in the Mo-Fe protein fraction of nitrogenase and free of the Fe protein fraction is obtained by a sequence of steps which incorporates procedures previously shown in the scientific literature, including U.S. Pat. No. 3,423,289, to be effective in the purification and fractionation of nitrogenase. This sequence usually comprises the following operations:

1. growing a nitrogen-fixing organism, e.g. Azotobacter, on a medium which contains little or no fixed nitrogen; such organisms develop a nitrogen-fixing enzyme system which is essential for the reduction of nitrogen gas to ammonia.

For example, *A. vinelandii* strain OP American Type Culture Collection (ATCC) 13705) was maintained on a modified N-free Burk's medium consisting of (in g/l) sucrose, 20; $MgSO_4 \cdot 7H_2O$, 0.2; $CaCl_2$(anhyd, 12 mesh), 0.06; Fe, 0.01; Mo, 0.001; $K_2HPO_4$, 0.8; $KH_2PO_4$, 0.2. Fe was added as $FeCl_3$ from a solution of 24.0 g $FeCl_3 \cdot 6H_2O$ dissolved in $H_2O$ and made to 500 ml (this provides 10 mg Fe/ml); Mo was added as $Na_2MoO_4$ from a solution of 2.5 g $Na_2MoO_4 \cdot H_2O$ dissolved in $H_2O$ and made to 1,000 ml (this provides 1 mg Mo/ml). The phosphate salts solution was adjusted to pH 7.5 and autoclaved separately from the other medium components.

The culture was maintained at 30° at maximum rotation rate of a Gyrorotary agitator and was subcultured daily (5Percent inoculum, 100 ml cultures).

As needed, inocula of 20 liter fermentations were prepared by inoculating 500 ml medium in 2-liter flasks with 20 ml of daily transfer cultures; the 2-liter flasks were agitated as above. Twenty liter batches of cells were grown in a Brunswick fermentor, using 300 ml of 16–24 hr culture as inocula. After about 16 hrs. of growth at 30° at high rates of aeration and mechanical agitation, the cells were harvested with a Sharples supercentrifuge, yielding 100–150 g wet wt. cell paste (about 25 percent dry matter), which was placed in a polyethylene bag, frozen in liquid nitrogen and stored in a −80° C. freezer. Paste stored in this way for even prolonged periods of time provides active extracts.

2. Suspending the nitrogen-fixing organisms or cell paste in aqueous medium, e.g. potassium phosphate ($K_2HPO_4$) buffer of ca. 0.025 M concentration and pH of ca. 7, and breaking these microorganisms in, for example, a French pressure cell so as to release into the aqueous medium the intracellular components, including nitrogenase.

3. Centrifuging the broken cell suspension to separate insoluble material, which is discarded, from the soluble material including the nitrogenase, contained in the supernatant solution.

4. Nucleic acids are separated from the soluble material by treating the supernatant solution with protamine sulfate, a commercially available proteinaceous material which preferentially forms an insoluble complex with nucleic acids. This complex is removed by centrifugation leaving a supernatant solution which includes nitrogenase. This supernatant solution and all subsequent solutions containing nitrogenase or nitrogenase components are isolated from oxygen by maintaining them under an oxygen-free atmosphere such as nitrogen, hydrogen, argon or helium and mixing with them only solutions from which oxygen has been removed. This is necessary because oxygen is known to inhibit and/or destroy nitrogen-fixing activity in purified preparations of nitrogenase.

5. This supernatant solution containing the nitrogenase is stirred and heated in a boiling water bath until the temperature of the solution reaches 60° C. at which time the solution is transferred to a 60° C. constant temperature bath where it remains for 5 to 10 minutes. It is then placed in an ice bath to bring the temperature to ca. 10° C. During the course of this heat treatment, considerable flocculation is observed in the preparation, as heat-labile proteins become denatured and coagulate. These are separated by centrifugation and discarded, leaving a supernatant solution containing nitrogenase and other heat-stable soluble components.

6. The pH of the solution is changed from ca. 7.0 to 6.5 by the addition of HCl, and it is then treated with protamine-sulfate which preferentially reacts with certain of the soluble protein components, including nitrogenase, to form insoluble complexes. These insoluble protein-protamine complexes are separated from the soluble components by centrifugation. The soluble components are discarded.

7. The insoluble protein-protamine complexes are then suspended in dilute buffer, e.g., 0.01 M potassium phosphate buffer of pH 7, and to this suspension is added phosphocellulose. Phosphocellulose is a reagent which forms an insoluble complex with protamine apparently by displacing the nitrogenase in the protein-protamine complex. This results in the solubilization of nitrogenase and other protamine-bound proteins which are then separated from the insoluble phosphocellulose protamine complexes by centrifugation to yield a protein solution rich in nitrogenase.

8. Fractionation of nitrogenase into two separate protein components, i.e. the Mo-Fe protein and the Fe protein, is accomplished by anion-exchange chromatography. For example the protein solution rich in nitrogenase is placed on a diethyl-aminoethyl (DEAE) cellulose column previously equilibrated with 0.02 M Tris-HCl buffer, pH 7.2, to which some of the protein, including nitrogenase, binds. Non-binding protein is washed away from the bound protein with 0.02 M Tris-HCl, pH 7.2. A solution of 0.15 M NaCl and 0.01–0.02 M Tris-HCl, pH 7.2, is then passed through the column. This causes some proteins (not the nitrogenase) which are weakly bound to the column to be released from the column and to be washed away. A solution of stronger salt concentration, i.e. 0.22–0.25 M NaCl in 0.01–0.02 M Tris-HCl pH 7.2 is then passed through the column. This causes some of the proteins (including the Mo-Fe protein component of nitrogenase) which are still bound to the column, to be released and to be washed away from the other proteins which remain bound to the column. These washed-off proteins are collected in a vessel. They constitute an 0.22–0.25 M NaCl, 0.01–0.02 M Tris HCl solution rich in the Mo-Fe protein fraction and free of the Fe protein fraction.

Some of the other proteins, including the Fe protein fraction of nitrogenase, which have remained bound to the DEAE cellulose, are released from the DEAE cellulose and washed off into another collection vessel by passing a 0.35 M NaCl, 0.01–0.02 M Tris-HCl solution through the column. This provides a 0.35 M NaCl, 0.01–0.02 M Tris-HCl, pH 7.2, solution rich in the Fe protein fraction and free or nearly free of the Mo-Fe protein. (In practice small amounts of Mo-Fe protein are usually found in this solution apparently due to its incomplete removal in the 0.22–25 M NaCl solution. Treating the nitrogenase-rich solution, prior to its being placed on the DEAE column, with several mg $Na_2S_2O_4$ per gram of protein has been found to be helpful in decreasing the amount of Mo-Fe protein in the 0.35 M NaCl, 0.01–0.02 M Tris-HCl wash).

The protein solution which has a high concentration of the Mo-Fe protein fraction and is free of the Fe-protein fraction, has a pH of about 7.4 and contains up to about 10 mg protein/ml. It also contains sodium chloride at a concentration of about 0.25 M. The subsequent treatments of this protein fraction consist of the following: (1) the protein solution is concentrated to about 30 mg protein/ml by using, e.g., an Amicon Corp. ultrafiltration apparatus fitted with an Amicon XM-50 filter. It is to be noted this treatment does not change the concentrations of NaCl or Tris-HCl; (2) 1 volume of the concentrated protein solution is mixed with 2 to 10 volumes of 0.02 M Tris-HCl buffer pH 7.2, preferably by the dropwise addition of the protein solution to the buffer, to reduce the salt concentration to a point where the protein fraction is no longer soluble. There is thus produced an insoluble product containing crystals of the Mo-Fe protein. The insoluble product comprises brown amorphous material and white crystals which separate out generally within 10 minutes; (3) the preparation is stirred gently for 1 hour during which time more of the insoluble material appears to form; (4) the insoluble material is separated and collected as a brown-to-gray pellet by centrifugation; (5) the light amber supernatant liquid is decanted and the pellet is washed by suspending it in a small volume of 0.01 to 0.02 M Tris-HCl buffer pH 7.2, and centrifuging; the almost colorless supernatant liquid is decanted; (6) the pellet is then dissolved in a small volume of 0.25 M of the salt, e.g., alkali metal or ammonium salt, for example, NaCl in 0.01 to 0.02 M Tris-HCl, pH 7.2, to yield a dark brown solution; (7) 1 volume of this solution is mixed with 2 to 10 volumes of 0.01 to 0.02 M Tris-HCl buffer, pH 7.2, preferably by the dropwise addition of the protein solution to the buffer while stirring gently; gray-white crystals of the Mo-Fe protein form immediately upon mixing.

The preceding steps are conducted in an inert atmosphere such as nitrogen or argon at temperatures preferably in the range of 0°–25° C. Conveniently, room temperature can be used with 0°–5° C. preferred for centrifugations. The pH for all operations is preferably near neutral, i.e., 6–8. Buffers which aid in maintaining this neutrality are helpful in the steps involved in purification and separation. All protein concentrations were determined by the well known biuret procedure.

Figure 2:
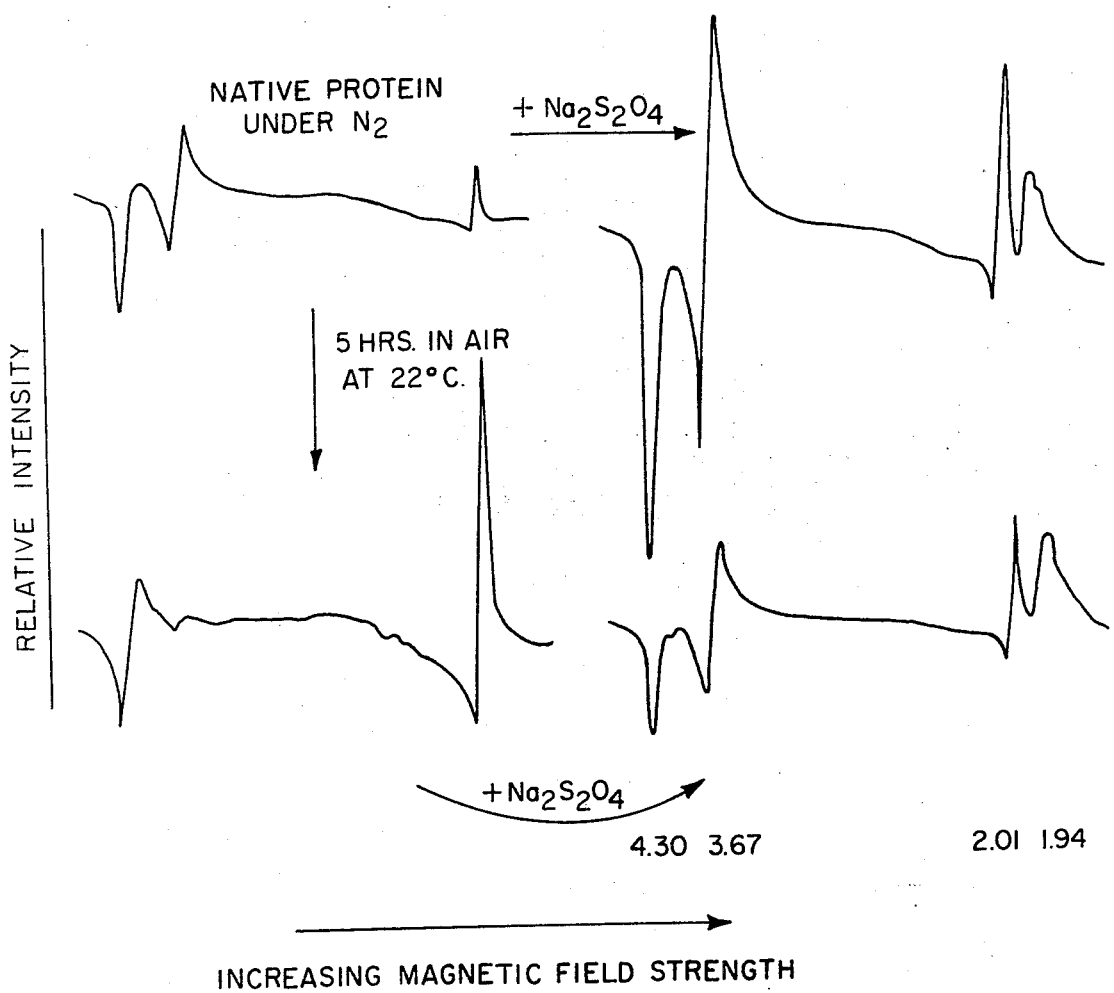

FIG. 1 shows Mossbauer spectra of Mo-Fe protein derived from *A. vinelandii*, and FIG. 2 shows electron paramagnetic resonance spectra of the protein at 4.2° K.

SPECIFIC EMBODIMENTS OF THE INVENTION

The following examples are illustrative, but not limitative, of the invention.

EXAMPLE 1

Wet-packed cells (154 g) of *Azotobacter vinelandii*, strain OP(ATCC No. 13705) obtained as described above were suspended in 420 ml of 0.025 M potassium phosphate buffer, at or near neutrality. The cells were ruptured in a French pressure cell operated at 16,000–20,000 lbs./sq. in. The broken cell suspension was centrifuged at 5° C., for 12 hours at 11,000 rpm in a Servall RC-2 centrifuge. The solid material comprising cell debris was discarded. The supernatant liquid, 466 ml containing 14,000 mg protein derived from the bacteria, was treated with 69.9 ml of a 2 percent protamine sulfate solution, pH 6.0, at 0° C. After stirring gently for 20 minutes, the preparation was centrifuged for 30 minutes at 14,000 rpm. at 5° C. The solid was discarded. The supernatant solution, 500 ml volume containing 13,220 mg protein, was stirred under a flow of nitrogen at 22° C. for 30 minutes. All subsequent operations were also conducted under nitrogen. The solution was then heated in a boiling water bath with constant stirring until the temperature of the protein solution reached 60° C., at which time it was transferred to a 60° C. bath and held there 10 minutes. Then it was cooled to about 10° C. in an ice bath and centrifuged for 30 minutes at 14,000 rpm at 5° C. The solid material which precipitated was discarded and the supernatant solution, 450 ml volume containing 4,720 mg protein was adjusted to pH 6.5 with HCl. The solution was then treated with 15.6 ml of 2 percent protamine sulfate solution, pH 6.0 at 0° C., and after stirring gently for 20 minutes, the preparation was centrifuged for 10 minutes at 14,000 rpm at 5° C. The supernatant liquid was discarded. The solid material, obtained as a pellet, was moistened with 1 ml of 0.01 M potassium phosphate buffer, pH 7.0, and stored overnight at room temperature. The following morning the pellet was suspended in several ml of 0.01 M phosphate buffer. To this suspension was added 2.32 grams of a material such as phosphocellulose that contains a large number of negative groups and displaces the nitrogenase which goes into solution. After stirring gently for 30 minutes the slurry was filtered through sintered glass, the filtrate being a brown colored solution. Additional potassium phosphate buffer was added to wash the residual nitrogenase material through the filter. There was thus obtained 36 ml of a dark brown solution containing 36.1 mg of protein per milliliter. This solution was stored under nitrogen at 22° C.

Twenty ml of this brown solution was treated with several mg of $Na_2S_2O_4$, stirred gently for 5 minutes then placed on a column of DEAE cellulose (50 ml in volume) previously equilibrated with nitrogen-saturated 0.02 M Tris-HCl buffer, pH 7.2, and maintained under nitrogen. A dark brown band formed near the top of the column. After the protein solution entered the column, 20 ml of nitrogen-saturated 0.02 M Tris-HCl buffer, pH 7.2, was added to the column to wash the brown band into the column.

Tris-HCl, hundred ml of a nitrogen-saturated solution of 0.15 M NaCl – 0.017 M Tris-HCl, pH 7.2, was then added to the column; this caused a red band to separate from the brown band and to move down and through the column. This red band was discarded since it comprised unwanted proteins.

One hundred ml of a nitrogen-saturated solution of 0.25 M NaCl – 0.015 M Tris-HC1, pH 7.2, was then added to the column. A dark brown band separated from the original brown band and was eluted from the column. The resultant brown eluent was collected under nitrogen; it consisted of the Mo-Fe protein solution in about 40 ml of 0.25 M NaCl aqueous solution.

One hundred ml of a nitrogen-saturates solution of 0.35 M NaCl –0.013 M Tris-HC1, pH 7.2, was then added to the column. A second brown band moved down and off the column and was collected under nitrogen in a volume of 37 ml. This solution contained the Fed protein and was the source of Fe protein used in the procedures mentioned subsequently.

The Mo-Fe protein fraction, which contained 9.55 mg protein per milliliter was concentrated from about 40 ml to a total of 13 ml, using an Amicon ultrafiltration cell fitted with an XM–50 filter. The protein concentration was thus raised to 31.1 mg/ml. while salt concentration remained the same. i.e., 0.25 M. To the 13 ml was added 26 ml of 0.02 M Tris-HC1, pH 7.2 to give a solution containing less than 0.1 moles of NaCl per liter, i.e., 0.083 M. A brown amorphous material and white crystalline material began to form within 10 minutes. A sample of the preparation examined by phase contrast microscopy showed needle-like crystals. After stirring gently for 1 hour the preparation was centrifuged and a gray pellet was obtained. The supernatant liquid was decanted.

The pellet was dissolved in 0.25 M NaCl –0.015 M Tris-HCl to give a total volume of 5.4 ml, containing 27.4 mg protein per milliliter. To this solution 10.8 ml of 0.02 M Tris-HCl was added dropwise with gentle stirring to again reduce the concentration of NaCl to below 0.1 M. White crystalline material was observed to form quickly and by the time all the buffer had been added a dense mass of crystals had formed.

This preparation was centrifuged for 10 minutes at 14,000 rpm and yielded an almost colorless supernatant liquid and a gray pellet of crystals. These crystals were suspended in about 5 ml of 0.02 M Tris-HC1 pH 7.2, and centrifuged again as above. The almost colorless supernatant liquid was discarded.

The pellet that was obtained of crystal mass of Mo-Fe protein was dissolved in 0.25 M NaCl –0.015 M Tris-HC1, pH 7.2. This was centrifuged for 10 minutes at 14,000 rpm, and a small pellet which probably contained denatured protein was discarded. Homogeneity of the protein in solution was indicated by ultracentrifugation analysis which showed that the solution contained a single macromolecular component. Homogeneity of the protein was also shown by consistency of amino acid analyses through successive recrystallizations. Analysis for metals of the Mo-Fe protein in the solution by emission spectorscopy indicated the presence of only molybdenum and iron insignificant amounts and negligible amounts of other metals (except sodium because of its presence in the preparation in 0.25 M concentration). Analyses for molybdenum and iron indicate 0.05 – 0.08 percent Mo and 0.5–0.8 percent Fe.

Examination of the crystals of the Mo-Fe protein by optical microscopy indicated they are needles about $50\mu \times 3\mu$ and white, or possibly light yellow, in color. The molecular weight obtained by sedimentation equilibrium was estimated at 270,000, and based on minimal size with 2 microgram atoms of Mo per micromole of protein and 15 percent N, the molecular weight obtained was 250,000 to 310,000. Millimolar extinction coefficients based on 270,000 M.W. are 280 mμ: 470
412 mμ: 85

The criticality of this protein fraction in nitrogenase activity was established by assays for adenosine triphosphate dependent hydrogen evolution, a known reaction of nitrogenase as described by Bulen et al., *Proc. Natl. Acad, Sci. U. S.*, 53, 532 (1965) and also by assays for nitrogen fixation.

The assays for hydrogen evolution were performed by a modification of the commonly used Warbugg resiprometry technique. In this technique reactions are performed in an isolated system consisting of a reaction vessel and an attached manometer; the manometer is used to record pressure changes which occur in the reaction flask as a result of gas, e.g. hydrogen, being generated in the course of the reaction which takes place in the reaction vessel. Respirometer flasks were used for the assays. A respirometer flask is a glass vessel of about 20 ml volume designed to fit onto a manometer which serves as the gauge for measuring pressure changes in the vessels. These vessels are formed to provide compartments designated "main compartment," "side arm" and "center well." The side arm has a port which is closed with a glass plug. Material, e.g., solutions, placed in the side arm may be added to the main compartment by tipping the flask at an appropriate angle; the center well is designed so that its contents are not permitted to enter either the side arm or main compartment. Into the main compartment of an assay vessel is placed an aqueous solution of about pH 7 and containing 5μmoles adenosine triphosphate, 30 μmoles creatine phosphate and 5 μmoles $MgCl_2$. An amount of water to provide a total reaction mixture volume of 1.0 ml is also added to the main compartment. An aqueous solution of creatine kinase containing about 10 International units is added to the side arm. 0.1 ml 20% KOH is added to the center well and a piece of folded filter paper is inserted in this KOH solution. (The center well contents are designed as a trap to remove any carbon dioxide from the atmosphere of the flask since the presence of carbon dioxide could interfere with the analysis). The flask is then fitted to a manometer and the manometer-flask assembly is evacuated with a vacuum pump and filled with argon. The glass plug is then removed from the side arm and 0.1 ml of an 0.2 M aqueous solution of $Na_2S_2O_4$ containing 20 μmoles $Na_2S_2O$is added to the main compartment. Aqueous solutions containing known amounts of nitrogenase fractions are added to the side arm. (Note: the omission of any of the components listed above results in either no reaction or a greatly attenuated reaction). The entry of air into the flasks during these additions is prevented by flushing argon into the flask through the attached manometer and out of the flask via the aforementioned port. The port is then plugged and the flask, still attached to its manometer, is placed in a 30° C. constant temperature bath with provision for gently rocking the flask to assure rapid gas-liquid equilibration. After temperature equilibration is reached, i.e. when flask and contents are at 30° C. (after about 5 minutes in practice) the level of manometer fluid is noted and the flask-manometer assembly is rapidly removed from the bath, tipped at such an angle as to cause the side arm contents and the main compartment contents to mix, thus initiating the assay reaction, replaced in the bath and rocked. At designated time intervals of e.g. 5 minutes following tipping, the level of the manometer fluid is recorded.

Changes in this level reflect pressure changes in the flask; these pressure changes are due to the evolution of hydrogen gas according to the nitrogenase-catalysed reaction

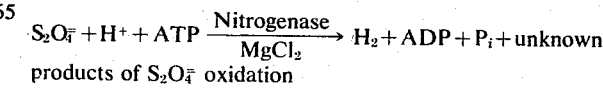

$$S_2O_4^= + H^+ + ATP \xrightarrow[MgCl_2]{Nitrogenase} H_2 + ADP + P_i + unknown$$

products of $S_2O_4^=$ oxidation where ATP is adenosine triphosphate, ADP is adenosine diphosphate and $P_i$ is orthophosphate ion. The stoichiometry of the reaction is unknown. The amount of hydrogen gas evolved in a given reaction vessel is calculated from the magnitude of pressure change, as reflected in the observed change in manometer fluid level.

Assays were run on a number of protein samples and the results recorded in Table 1. The data show that the Mo-Fe protein has no activity by itself in the aforesaid hydrogen evolution assay and that the Fe protein fraction possesses only slight activity. This latter is attributed to a small amount of Mo-Fe protein as contaminant. Vigorous activity resulted from the combination of the Mo-Fe protein fraction and the Fe protein fraction, and this activity is shown in Table I to vary directly with the level of Mo-Fe protein when the amount of Fe protein is held constant.

TABLE I

| Fe Protein Fraction (mg) | Mo-Fe Protein (mg) | $\mu$moles $H_2$ evolved per 15 min. |
|---|---|---|
| 0.34 | 0 | .33 |
| 0.68 | 0 | .96 |
| 0 | 2.37 | 0 |
| 0.34 | 0.024 | .85 |
| 0.34 | 0.071 | 1.85 |
| 0.34 | 0.142 | 2.79 |
| 0.34 | 0.237 | 3.57 |

EXAMPLE 2

A preparation of crystalline Mo-Fe protein was obtained by the procedure described in Example 1 and assayed for its ability to fix nitrogen by reducing it to ammonia in company with the Fe-protein fraction. The results demonstrate the essentiality of the Mo-Fe protein for nitrogen fixation.

The assays were performed in a manner similar to that described for hydrogen gas evolution except that the conditions were altered to permit the generation and detection of ammonia. Reaction flasks and reaction components were identical to those described for hydrogen evolution assays, except that argon was replaced by nitrogen to permit the nitrogenase-catalyzed reaction:

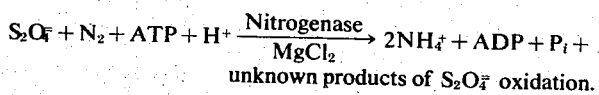

unknown products of $S_2O_4^=$ oxidation.

The complete stoichimetry of the reaction is unknown. The ammonia thus formed exists in aqueous solution as ammonium ion. After the reactions had proceeded for 15 minutes, the ammonia was separated from the reaction mixture by microdiffusion and determined colorimetrically with Nessler's reagent. The microdiffusion was conducted in 15 milliliter serum bottles fitted with rubber stoppers holding an etched glass rod. One milliliter of saturated $K_2CO_3$ was added to a one milliliter aliquot of a reaction mixture, and the rubber stopper holding the etched rod which had been previously dipped in a N sulfuric acid solution was quickly inserted. Distillation was allowed to proceed for 90 minutes with slow shaking while maintaining the mixture at a temperature of about 30° C. The etched tip rod was then placed in a 10 milliliter beaker containing 4 milliliters of Nessler's reagent prepared as described by Johnson, J. Biol. Chem., 137,375 (1941) and diluted 1:1 with water. Three milliliters of 2 N sodium hydroxide were added, the mixture was stirred, and the etched glass rod removed. After standing 25 minutes at room temperature the absorbance was measured at 4,900 A. and ammonia values were obtained from a standard curve.

From the ammonia values obtained the amount of molecular nitrogen fixed was calculated from the relationship $N_2 \rightarrow 2NH_3$. The data are given in Table II.

TABLE II

| Fe Protein Fraction (mg) | Mo-Fe Protein (mg) | $\mu$moles $N_2$ fixed after 15 min. |
|---|---|---|
| 0.55 | 0 | .11 |
| 0 | .035 | .00 |
| 0.55 | .035 | .71 |

EXAMPLE 3

A preparation of crystalline protein obtained by the procedure described in Example 1 was analyzed to determine the effect to salt concentration on Mo-Fe protein solubility. It was found that Mo-Fe protein is more soluble in aqueous sodium chloride solutions at 0° C. than at 22° C. and exhibits a negative heat of solution of about −5 kcal/mole.

Mo-Fe protein was added in supersaturating amounts to solutions of varying NaCl concentration (all containing 0.015 M Tris-HCl buffer of pH 7.4 for pH control) under anaerobic conditions at 22° C. After gentle stirring for 30 minutes, each preparation contained an excess of protein which remained undissolved. The preparations were then centrifuged to remove the undissolved protein. The supernatant liquids containing dissolved protein were analyzed for Mo-Fe protein content and the results are presented in Table III. These show that in salt concentrations less than about 0.08 M very little of the protein is dissolved, but that at higher concentrations of salt the amount of Mo-Fe protein which dissolves is a function of the salt concentration.

TABLE III

Solubility of Mo-Fe Protein in NaCl Solution

| $M_{NaCl}$ | mg Mo-Fe protein dissolved per ml |
|---|---|
| 0.005 | 0.18 |
| 0.018 | 0.37 |
| 0.038 | 0.22 |
| 0.058 | 0.19 |
| 0.080 | 0.38 |
| 0.102 | 1.20 |
| 0.122 | 3.16 |
| 0.144 | 6.88 |

Several of the physical and chemical properties of Mo-Fe protein were obtained by analyzing samples obtained by the procedure of Example 1.

Elemental analyses indicate the presence of 36 gram-atoms Fe, 2 gram-atoms Mo and at least 25 gram-atoms of acid-labile S per 270,000 grams of the protein.

The effective magnetic moment per Fe atom was determined to be about 3 Bohr magnetons.

Chemical analysis gave essentially the following amino acid composition of the protein molecule. No significant differences were observed in the tabulation below through four successive recrystallizations of the protein.

TABLE IV

| Amino Acid | Number of Amino Acid Molecules per Histidine |
|---|---|
| Alanine | 3.09 |
| Arginine | 1.97 |
| Aspartic | 4.55 |
| Half Cystine | 0.67 |
| Glutamic | 4.57 |
| Glycine | 3.77 |
| Histidine | 1.00 |
| Isoleucine | 2.46 |
| Leucine | 3.48 |
| Lysine | 3.23 |
| Methionine | 1.57 |
| Phenylalanine | 1.86 |
| Proline | 1.84 |
| Serine | 2.44 |
| Threonine | 2.10 |
| Tryptophan | 0.91 |
| Tyrosine | 1.43 |
| Valine | 3.17 |

FIG. 1 shows the Mössbauer spectra of Mo-Fe protein prepared from *A. vinelandii* grown in a medium containing iron enriched (92.8 percent) in the isotope $Fe^{57}$. The spectra were obtained by activating the Fe⁵⁷ in such sample with gamma radiation from Co⁵⁷ and recording differences in the intensity of the radiation emitted from the sample and from the Co⁵⁷ as a function of the velocity at which the Co⁵⁷ was moved towards or away from the sample. Spectra obtained in this manner reflect subtle effects on the energy states of $Fe^{57}$ nuclei which arise from interactions of the $Fe^{57}$ nuclei with extranuclear electrons which are themselves influenced by their environments. Thus the spectra derive their particular character from the particular nature of the environment(s) of the iron in the sample. The spectra of the Mo-Fe protein can be described as follows: in the temperature range of about 20° to 200° K, as illustrated by a typical spectrum obtained at 50° K. (FIG. 1), the spectrum appears as a large doublet (the bifurcated portion) which exhibits a quadropole split (Q.S.), i.e., distance between minima, of 0.78 mm/sec; an isomer shift (I.S.), i.e., distance from zero point to half-way between minima, of 0.39 mm/sec; and an additional signal on the high field shoulder of the doublet. At temperatures below 20° K, as for example at 4.2° K. as shown in FIG. 1, the doublet begins to collapse and outer lines develop. A general reference for this technique is Mössbauer Effect: Principles and Applications, G. K. Wertheimr, Academic press, N.Y., 1964.

The electron paramagnetic resonance (EPR) spectra of the Mo-Fe protein were obtained at 4.2° K by placing samples of the Mo-Fe protein in a magnetic field, subjecting them to radiowave irradiation and measuring the energy absorbed by the samples under these conditions. Spectra obtained by this technique reflect the presence of paramagnetic species, i.e., atoms possessing unpaired electrons, in the sample and can in some instances identify a particular paramamagnetic species and indicate the amount present. The sequence of EPR spectra of the Mo-Fe protein, FIG. 2, was obtained using 1. a sample of the native protein, as prepared by the process of Example 1, kept under nitrogen;
2. a sample of the native protein kept under nitrogen and treated with about 5 mg of $Na_2S_2O_4$ (sodium hydrosulfite) per gram of protein;
3. a sample of the native protein exposed to air for 5 hours at 22° C.;
4. a sample of the native protein exposed to air for 5 hours at 22° C. and then treated with about 5 mg of $Na_2S_2O_4$ per gram of protein.

FIG. 2 shows resonances at g values of about 2.0, 3.7 and 4.3. Upon treatment of the protein with $Na_2S_2O_4$ resonance at $g = 1.94$ develops. Upon exposure of the protein to air the signal at $g = 3.7$ disappears but is restored by treatment with $Na_2S_2O$ in the absence of oxygen.

Although the process described shows the use of cells from *A. vinelandii*, cells from other nitrogen-fixing organisms can also be used, as for example *A. agilis* and *A. chroococcum*. Further, salt solutions of purified Mo-Fe protein derived from other types of nitrogen-fixing bacteria may be used to produce crystalline protein by reducing the concentration of the salt as previously described herein.

In addition to its utility for transforming gaseous nitrogen into ammonia, the crystalline Mo-Fe proteinaceous composition is particularly useful as a catalyst when combined with purified Fe protein for chemical reactions, such as reducing acetylenes to ethylenes.

I claim:
1. The anaerobic process of treating
   an aqueous solution having a pH of 6 to 8, containing
      about 30 mg/ml of dissolved molybdenum-iron protein fraction of nitrogenase derived from nitrogen-fixing bacteria and essentially free from the iron protein fraction of said nitrogenase, and
   a low moelcular weight water-soluble salt
      capable of dissociating in water into anions and cations, the valency of the individual anion or cation generally not exceeding two,
   comprising the steps of
      anaerobically reducing the concentration of said salt to a point where the said molybdenum-iron protein fraction crystallizes out of solution and
      anaerobically recovering the crystals.
2. The process of claim 1 in which the protein fraction is derived from nitrogen-fixing bacteria of the genus Azotobacter.
3. The process of claim 2 in which the nitrogen-fixing bacteria is *Azotobacter vinelandii*.
4. The process of claim 1 in which the salt is NaCl.
5. The process of claim 4 in which the solution contains more than 0.38 mg of molybdenum-iron protein fraction per milliliter of solution and the concentration of NaCl is reduced to below 0.08 molar concentration.
6. The product produced by claim 1 having essentially the following amino acid composition:

| Amino Acid | Number of Amino Acid Molecules per Histidine |
|---|---|
| Alanine | 3.09 |
| Arginine | 1.97 |
| Aspartic | 4.55 |
| Half Cystine | 0.67 |
| Glutamic | 4.57 |
| Glycine | 3.77 |
| Histidine | 1.00 |
| Isoleucine | 2.46 |
| Leucine | 3.48 |
| Lysine | 3.23 |
| Methionine | 1.57 |
| Phenylalanine | 1.86 |
| Proline | 1.84 |
| Serine | 2.44 |
| Threonine | 2.10 |
| Tryptophan | 0.91 |
| Tyrosine | 1.43 |
| Valine | 3.17 |

* * * * *

UNITED STATES PATENT OFFICE
CERTIFICATE OF CORRECTION

Patent No. 3,668,074    Dated June 6, 1972

Inventor(s) RICHARD CHARLES BURNS

It is certified that error appears in the above-identified patent and that said Letters Patent are hereby corrected as shown below:

Col. 2, line 8, before "$H_2O$" insert -- 2 --.

Col. 2, line 16, change "of" to -- for --

Col. 2, line 2, change "(ATCC)" to -- (ATCC --

Col. 3, line 24, insert commas after "HCl" and "7.2"

Col. 3, line 43, change "0.22-25" to -- 0.22-0.25 --

Col. 5, line 4, change "Tris-HCl" to -- One --

Col. 5, line 16, change "saturates" to -- saturated --

Col. 5, line 20, change "Fed" to -- Fe --

Col. 5, line 60, change "insignificant" to -- in significant --

Col. 6, line 7, change "Warbugg" to -- Warburg -- and correct the spelling of "respirometry"

Col. 6, line 41, change "$Na_2S_2O$" to -- $Na_2S_2O_4$ --

Col. 9, line 23, correct the spelling of "Wertheim".

Signed and sealed this 27th day of March 1973.

(SEAL)
Attest:

EDWARD M. FLETCHER, JR.
Attesting Officer

ROBERT GOTTSCHALK
Commissioner of Patents